2,759,239

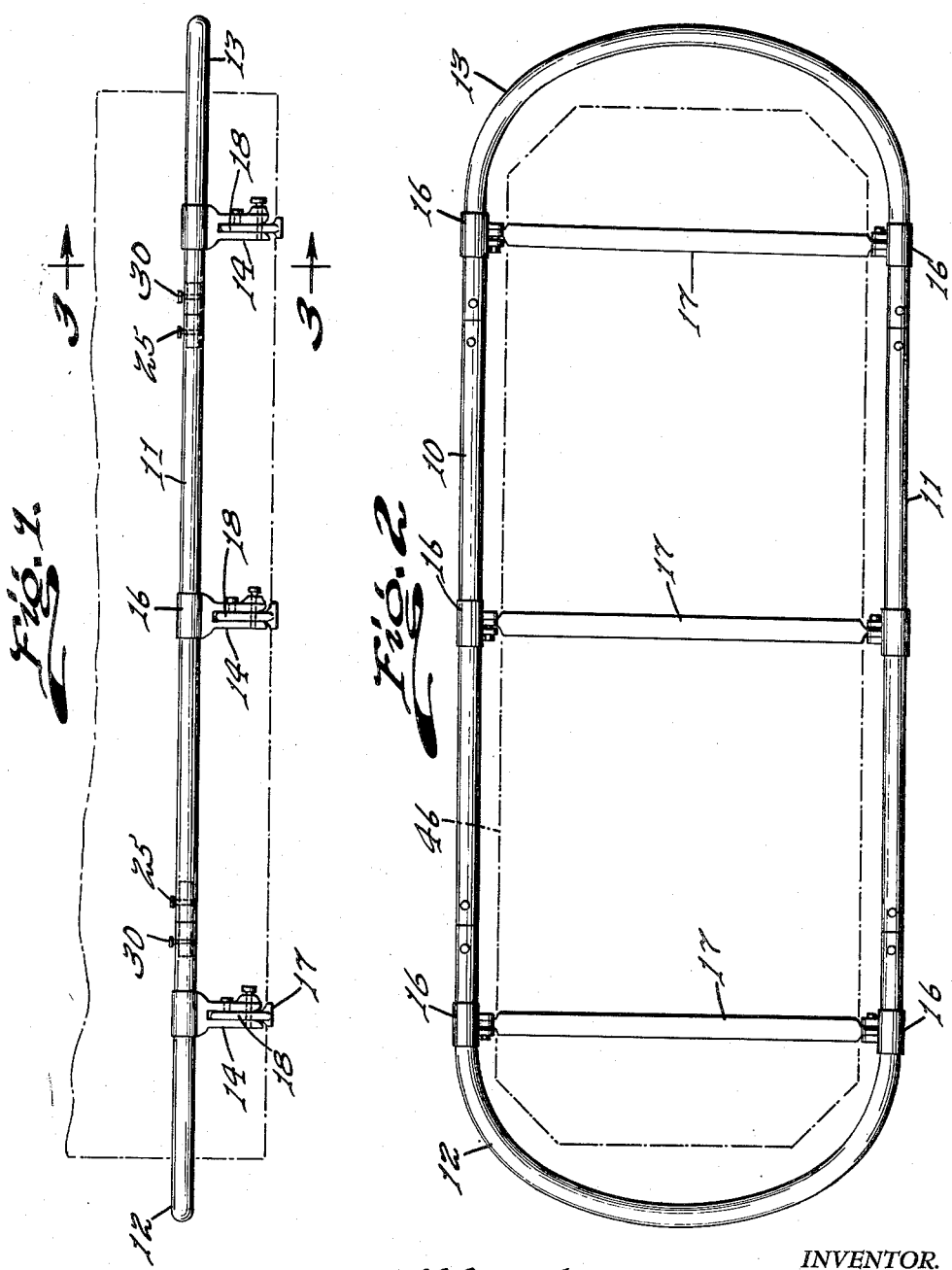

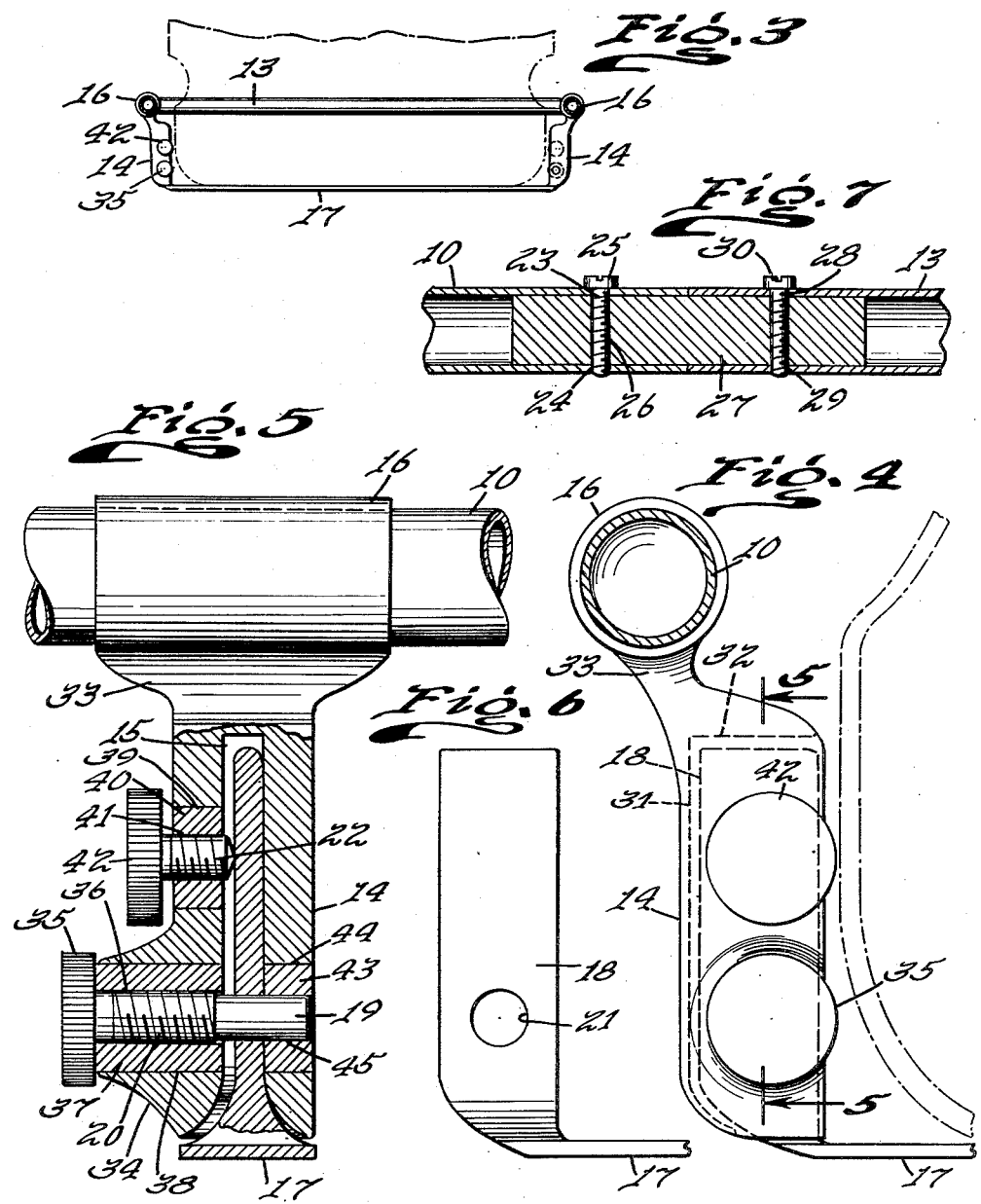

PORTABLE CARRYING HANDLES

William N. Snyder, Mansfield, Ohio

Application June 21, 1955, Serial No. 517,004

2 Claims. (Cl. 27—27)

This invention relates to a frame patterned to support heavy objects, such as caskets, vaults, and the like, and in particular, a pair of spaced parallel tubular side bars connected at the ends with arcuate substantially semi-circular handles, and having transversely disposed support bars removably attached to hangers depending from the side bars whereby an object, such as a casket, resting on the support bears is positioned with the lower part extended below the side bars.

The purpose of this invention is to provide a carrying frame for elongated heavy objects wherein upon positioning an object upon a stand or other supporting means the support bars may readily be removed from the frame and the frame carried upwardly over the object leaving the object without the frame and whereby the frame is adapted to be reused.

Substantially all caskets are provided with carrying handles and where caskets are formed of concrete, plastic, and other cast materials, the metal handles are the most valuable elements thereof and as the handles are permanently attached they are buried with the casket. With this thought in mind, this invention contemplates a carrying frame upon which a casket, vault, or the like rests whereby the casket or the like may be carried from one position to another and wherein a complete frame is adapted to be removed and reused.

The object of this invention is, therefore, to provide a complete frame having object carrying support bars depending therefrom and removably attached thereto whereby upon arriving at the destination of an object carried by the frame the support bars and frame are readily removable from the object.

Another object of the invention is to provide a carrying frame for caskets, vaults, and the like in which such devices are dropped downwardly in the frame making it substantially impossible for the object to slide from the frame.

Another important object of the invention is to provide a frame having gripping handles at the ends and removable transversely disposed support bars at intermediate points therein in which the frame is collapsible to facilitate storing and shipping.

A further object of the invention is to provide a collapsible frame for carrying caskets, vaults, and the like in which the frame is of a simple and economical construction.

With these and other objects and advantages in view, the invention embodies a pair of parallel tubular bars, arcuate handles detachably connected to ends of the bars, hangers having slots therein depending from sleeves positioned on the bars, locking and snug screws threaded in the hangers and positioned to extend into the slots therein and support bars having upwardly extended tongues at the ends with the tongues adapted to be positioned in the slots of the hangers and with openings through the tongues positioned to receive studs extended from ends of the locking screws.

Other features and advantages of the invention will appear from the following description, taken in connection with the drawings, wherein:

Figure 1 is a side elevational view of the improved carrying frame illustrating, in broken lines, the position of a casket or vault resting upon support bars in the lower part of the frame, the upper part of the casket or vault being broken away.

Figure 2 is a plan view of the frame also showing a casket or vault in broken lines and positioned on support bars of the frame.

Figure 3 is a cross section through the frame showing the support bars and hangers and also showing the lower portion of a casket positioned in the frame in broken lines, said section being taken on line 3—3 of Figure 1.

Figure 4 is a cross section through one side of the frame, similar to that shown in Figure 3, showing a side bar, hanger, and support bar and also a portion of a casket positioned in the frame, the parts being shown on an enlarged scale.

Figure 5 is a side elevational view of a sleeve at the upper end of a hanger with the sleeve positioned on a side bar of the frame and with the lower part of the hanger shown in section, the section being taken on line 5—5 of Figure 4.

Figure 6 is a side elevational view showing a tongue at one end of one of the support bars.

Figure 7 is a longitudinal section through one of the side bars of the frame illustrating a typical connection for connecting the end sections or handles of the frame to the intermediate or parallel side bars thereof.

Referring now to the drawings, wherein like reference characters denote corresponding parts, the improved portable carrying frame of this invention includes parallel tubular side bars 10 and 11, end sections or handles 12 and 13, hangers having depending sections 14 with slots 15 therein carried by sleeves 16 and support bars 17 having tongues 18 extended upwardly from ends thereof, the tongues being adapted to nest in the slots 15 with studs 19 of locking screws 20 extended through openings 21 therein and with upper portions of the tongues clamped in position with snug screws 22.

Although the side bars 10 and 11 are illustrated as being tubular, it will be understood that the bars may be solid or formed of other suitable structural shapes. In the design shown, ends of the side bars are provided with openings 23 and 24 in which screws 25 are positioned, the screws being threaded in openings 26 in splice rods 27 positioned with ends thereof extended into ends of the side bars and with the opposite ends extended into straight sections at the ends of the handles. The ends of the handles are also provided with openings, such as the openings 28 and 29 corresponding to the openings 23 and 24, and screws 30 extended through the openings 28 and 29 are threaded into the rods 27, as shown in Figure 7. With the connections or splices formed in this manner, the frame is readily collapsible as by removing either the screws 30 or the screws 25 the end sections or handles may be removed from the side bars of the frame.

The slots 15 in the depending portions 14 of the hangers extend inwardly to broken lines 31, shown in Figure 4, and upwardly to broken line 32 whereby the slots are adapted to receive the tongues 18 extended upwardly from ends of the support bars 17. The hangers are connected to the sleeves 16 with offset portions 33 and with the sleeves freely slidable on the side bars and handles the support bars 17 may readily be positioned to correspond with objects desired to be carried in the frame.

The depending portions 14 of the hangers are provided with bosses 34 in which the locking screws 20 are positioned, the screws, which are provided with heads 35, being threaded in internally threaded openings 36 in bushings 37 positioned in openings 38 of the hangers, the openings 38 being positioned whereby the studs 19 of the screws 20 are in registering relation with openings 21 of the tongues 18 of the support bars whereby the studs extend through the openings locking the support bars in the hangers. The hangers are also provided with openings 39 in which inserts 40 with internally threaded openings 41 therein are positioned and the screws 22, which are provided with heads 42, are threaded in the openings of the inserts whereby inner ends of the screws are adapted to urge the tongues 18 of the support bars against surfaces of opposite portions of the hangers whereby the tongues are positively held and movement thereof in the slots is prevented. The opposite sides of the hangers are also provided with inserts 43 that are mounted in openings 44 and the inserts 43 are positioned whereby openings 45 therein are positioned to receive the studs 19 of the locking screws 20.

With the parts designed and assembled as shown and described, the end sections or handles of the frame are assembled with the side bars 10 and 11 and the hangers with the support bars 17 depending therefrom are adjusted to suitable positions on the side bars and handles whereby a casket, vault, or the like, as indicated by the broken lines 46, may be positioned upon the support bars with the lower portion of the casket extended through and positioned in the frame. By this means, screws, bolts, or other fastening elements for retaining the casket in the frame are obviated.

In removing the frame from the casket, it is only necessary to loosen the snug screws 22 and withdraw the locking screws 20 until ends of the studs 19 pass through the openings of the tongues 18 whereby the tongues are released from the hangers and with the support bars free they may readily be removed and the entire frame may be moved upwardly over the casket. The frame is, therefore, adapted to be reused and the parts may readily be taken apart for storing and shipping.

It will be understood that modifications, within the scope of the appended claims, may be made in the design and arrangement of the parts without departing from the spirit of the invention.

What is claimed is:

1. In a portable carrying frame, the combination which comprises spaced parallel tubular side bars having handles connected to the opposite ends of said side bars, depending hangers having slots therein and having sleeves on upper ends thereof positioned with the sleeves on said side bars and handles, transversely disposed support bars having tongues extended upwardly from ends thereof positioned with the tongues in the slots of the hangers, and means for securing the tongues of the support bars in said hangers.

2. In a portable carrying frame, the combination which comprises spaced parallel tubular side bars, handles connected to the ends of the side bars, depending hangers having slots therein and having sleeves on upper ends thereof positioned with the sleeves on said side bars and handles, transversely disposed support bars having tongues extended upwardly from ends thereof positioned with the tongues in the slots of the hangers, locking screws threaded in the hangers and extended through the tongues for temporarily retaining the support bars in the hangers, and snug screws also threaded in the hangers and positioned to engage said tongues for rigidly clamping the tongues in position in the slots of the hangers.

References Cited in the file of this patent
UNITED STATES PATENTS

| | | |
|---|---|---|
| 737,580 | Carpenter | Sept. 1, 1903 |
| 821,720 | Kidd | May 29, 1906 |
| 1,857,008 | Adcock | May 3, 1932 |
| 1,965,644 | Heffelfinger | July 10, 1934 |
| 2,614,266 | Smith | Oct. 21, 1952 |